UNITED STATES PATENT OFFICE.

WILLIAM A. FAIRBURN, OF MORRISTOWN, NEW JERSEY, ASSIGNOR TO THE DIAMOND MATCH COMPANY, OF CHICAGO, ILLINOIS, A CORPORATION OF ILLINOIS.

PROCESS OF TREATING MATCH COMPOSITIONS AND THE PRODUCT THEREOF.

1,406,176.  Specification of Letters Patent.  Patented Feb. 14, 1922.

No Drawing.  Application filed June 7, 1921. Serial No. 475,612.

*To all whom it may concern:*

Be it known that I, WILLIAM A. FAIRBURN, a citizen of the United States, and resident of Morristown, in the county of Morris and State of New Jersey, have invented certain new and use Improvements in Processes of Treating Match Compositions and the Product Thereof, of which the following is a specification.

This invention relates to the manufacture of matches.

One object of my invention is to provide a match-head composition whereof a less quanity by weight unit is required than heretofore for the formation of individual match heads, thereby effecting economy in splint dipping.

Another object of my invention is to provide a match head of uniform minutely cellular texture which will ignite and burn more freely and evenly than the dense composition heads heretofore employed, and which cellular composition will dry more rapidly and uniformly than the dense composition, and thus shorten the manufacturing cycle and reduce the length of the match machine.

In carrying out the invention I agitate any usual or approved match composition in the presence of gas in such a manner that innumerable minute gas globules are formed within and throughout the composition, thereby increasing the volume of the mass. The composition when it is applied to the match splints forms ignition heads of minutely cellular texture.

A typical match composition that may be treated in pursuance of my invention is as follows:

Parts (by weight).
Glue _____ 4
Resin _____ 2
Zinc oxide_____ 1
Kieselguhr _____ 1½
Potassium chlorate_____ 9
Glass _____ 3½
Sulphur _____ 2
Water _____ 10

The ingredients and proportion just indicated may, of course, be materially changed to meet particular requirements.

In one mode of practicing my invention I introduce into the match composition to be treated a dry powder, such, for example, as precipitated chalk or marble dust, in the proportion of about three parts, by weight, of calcium carbonate to one hundred parts, by weight, of match composition.

The composition, with the addition of the calcium carbonate, is thoroughly mixed, stirred and ground, whereupon a suitable acid, such, for example, as a 20% solution of sulphuric acid, (in the proportion of about five parts of acid to one of calcium carbonate) is introduced in and thoroughly mixed with the composition, so as to yield carbon dioxide, as follows: $CaSO_4 + H_2O + CO_2$. The $CO_2$ thus evolved produces within the composition innumerable globules which materially inflate the compositior and thus augment its bulk and lessen its weight per unit cubic measure. The match splints are dipped in the composition in any usual or approved way to produce match heads, and the latter are then dried by carrying the dipped splints in spaced relation to each other through the air by means of the carrier chain of a match machine. The drying operation consumes a relatively short period of time, as above mentioned.

In another mode of practicing the invention I simply stir and agitate the match composition to be treated, and at the same time introduce therein by mechanical means free air or other suitable gas until the mass has been materially inflated by minute gas bubbles.

The proportions of the added gas or of the added gas producing materials can be so adjusted that the gas globules and the resulting cells will be extremely minute; and, further, the ingredients and proportions of the match composition may be materially changed to obtain a greater or less amount of inflation by the gas bubbles.

According to either procedure above described the volume of the composition is considerably augmented, with resultant economy in splint dipping, since much less of the composition by weight is required to produce the tips or bulbs of match heads. Moreover such tips or bulbs owing to their characteristic uniform cellular texture when dry, ignite more easily and evenly than the dense composition heads heretofore employed, for the reason that the former, when dry, are of uniform porous texture while the heads of the dense composition frequently assume capsular form during the drying operation, and in consequence produce a puffing and shooting when they are ignited.

It is to be understood that my invention is not limited to the treatment of any particular match composition, nor the specific mode or modes of operation herein described, nor to the use of any specific gas; as the match composition, the procedure, and the kind of gas employed may be varied within the principle of my invention and the scope of the appended claims.

I claim—

1. In the manufacture of matches, the step of agitating match head composition in the presence of gas to produce an aggregation of minute gas globules within the composition.

2. In the manufacture of matches, the process comprising agitating match head composition in the presence of gas to produce an aggregation of minute gas globules within the composition, dipping match splints in the composition to produce match heads, and then drying said heads.

3. In the manufacture of matches, the steps of adding gas-producing ingredients to the match head composition and thoroughly mixing and agitating the mass.

4. In the manufacture of matches, the steps of mixing calcium carbonate with the match head composition, and adding an acid which reacts with the calcium carbonate to form an aggregation of minute gas globules within the composition.

5. In the manufacture of matches, the process comprising intimately mixing with match head composition calcium carbonate in the proportion of about three parts, by weight, of calcium carbonate to one hundred parts, by weight, of match composition, and adding, under agitation, a solution of sulphuric acid, with the formation of an aggregation of minute gas globules within the composition.

6. A match composition having an aggregation of minute gas globules therein.

7. A match having a uniform minutely cellular composition head whereof the cells result from the introduction of gas in the composition before the application of the composition to the match splint.

Signed at New York, in the county and State of New York, this 6th day of June, A. D. 1921.

WILLIAM A. FAIRBURN.